United States Patent
Joo

(10) Patent No.: US 9,990,021 B2
(45) Date of Patent: Jun. 5, 2018

(54) DISPLAY DEVICE COMPRISING WAKE ON LAN(WOL) FUNCTION AND CONTROL METHOD THEREOF

(71) Applicant: SAMSUNG ELECTRONICS CO., LTD., Suwon-si (KR)

(72) Inventor: Seung-sook Joo, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days. days.

(21) Appl. No.: 14/936,809

(22) Filed: Nov. 10, 2015

(65) Prior Publication Data

US 2016/0132092 A1    May 12, 2016

(30) Foreign Application Priority Data

Nov. 10, 2014  (KR) .................. 10-2014-0155245

(51) Int. Cl.
*G06F 1/32* (2006.01)
*H04N 5/63* (2006.01)

(52) U.S. Cl.
CPC .......... *G06F 1/3209* (2013.01); *G06F 1/3265* (2013.01); *H04N 5/63* (2013.01); *Y02B 60/1242* (2013.01)

(58) Field of Classification Search
None
See application file for complete search history.

(56) References Cited

U.S. PATENT DOCUMENTS

| | | | | |
|---|---|---|---|---|
| 6,421,782 B1* | 7/2002 | Yanagisawa | .......... | G06F 1/1632 713/310 |
| 6,760,850 B1* | 7/2004 | Atkinson | .......... | G06F 1/24 713/300 |
| 8,069,293 B1* | 11/2011 | Rogan | .......... | G06F 13/385 370/248 |
| 2008/0209076 A1* | 8/2008 | Wang | .......... | G06F 9/24 709/250 |
| 2008/0229091 A1* | 9/2008 | Abu-Akel | .......... | H04L 12/12 713/2 |
| 2008/0301322 A1* | 12/2008 | Horibe | .......... | H04L 12/12 709/245 |
| 2009/0031124 A1* | 1/2009 | Das | .......... | G06F 9/4416 713/100 |
| 2012/0210112 A1* | 8/2012 | Suganami | .......... | H04L 12/12 713/2 |
| 2013/0031585 A1* | 1/2013 | Itagaki | .......... | H04N 21/4126 725/49 |
| 2013/0223308 A1* | 8/2013 | Chandra | .......... | H04W 52/0229 370/311 |
| 2014/0115378 A1* | 4/2014 | Chin | .......... | G06F 11/0709 714/4.3 |

* cited by examiner

*Primary Examiner* — Kim Huynh
*Assistant Examiner* — Danny Chan
(74) *Attorney, Agent, or Firm* — Staas & Halsey LLP

(57) ABSTRACT

A display apparatus and a method for controlling the display apparatus thereof are provided. The display apparatus includes a communicator configured to receive a power-on command from an external apparatus to perform a Wake On LAN (WOL) function and a controller configured to determine whether the WOL function is turned either on or off according to a network setting state.

6 Claims, 6 Drawing Sheets

WHEN WOL FUNCTION IS TURNED ON

<STANDBY MODE>

<OPERATION MODE>

WHEN WOL FUNCTION IS TURNED ON

<STANDBY MODE>

<OPERATION MODE>

WHEN WOL FUNCTION IS TURNED OFF

<STANDBY MODE>

<OPERATION MODE>

DISPLAY DEVICE COMPRISING WAKE ON LAN(WOL) FUNCTION AND CONTROL METHOD THEREOF

CROSS-REFERENCE TO RELATED APPLICATIONS

This application is related to, and claims priority benefit to, Korean Patent Application No. 10-2014-0155245, filed in the Korean Intellectual Property Office on Nov. 10, 2014, the disclosure of which is incorporated herein by reference.

BACKGROUND

1. Field

Aspects of the exemplary embodiments relate to a display apparatus and a method for controlling the display apparatus thereof, and more particularly, to a display apparatus that provides a Wake On LAN (WOL) function for controlling the power of the display apparatus remotely and a method for controlling the display apparatus thereof.

2. Description of the Related Art

Conventionally, the power of a display apparatus can be controlled through a power button on the display apparatus or a remote controller that controls the display apparatus. However, recently, a WOL function that enables controlling the power of a display apparatus (for example, PC, TV, etc.) remotely has been provided. The WOL function is a technology that allows a user to turn on the power of a plurality of display apparatuses in a distant area or to convert a display apparatus in a standby mode to be in an operation state. If a user is able to boot display apparatuses and perform a job remotely, the user does not need to visit each display apparatus on a network one by one and thus, user convenience can be enhanced.

The WOL function can be executed in a display apparatus as a server installed in a remote management application on a network transmits a wake-up signal to each display apparatus to be controlled remotely. When receiving the wake-up signal through a communicator of the display apparatus, the display apparatus may perform booting or convert to an operation mode.

However, a display apparatus that supports the WOL function should apply standby power to the communicator all the time in order to support the WOL function. Accordingly, when a user does not wish to use the WOL function or is unaware of the WOL function, standby power of the display apparatus may increase unnecessarily.

SUMMARY

Additional aspects and/or advantages will be set forth in part in the description that follows and, in part, will be apparent from the description, or may be learned by practice of the invention.

An aspect of at least one of the exemplary embodiments relates to a display apparatus that may determine whether to support a WOL function depending on a network setting state and a method for controlling the display apparatus thereof.

According to an exemplary embodiment, a display apparatus is provided including a communicator configured to receive a power-on command from at least one external apparatus to perform a Wake On LAN (WOL) function and a controller configured to determine whether the WOL function is turned either on or off according to a network setting state.

The controller, in response to a network setting being performed by a user, may turn on the WOL function, and in response to a network setting not being performed by a user, turn off the WOL function.

The apparatus may include a power supply unit configured to supply either standby power or operation power to the communicator, and the controller, in response to the WOL function being turned on, may control the power supply unit to switch to apply standby power to the communicator, and in response to the WOL function being turned off, control the power supply unit to switch to apply operation power to the communicator.

The controller, in response to the WOL function being turned on, may control the power supply unit to apply standby power to the communicator while the display apparatus is in a standby mode or in an operation mode.

The controller, in response to the WOL function being turned off, may control the power supply unit not to apply power to the communicator while the display apparatus maintains a standby mode, and in response to the display apparatus being converted to be in an operation mode, control the power supply unit to apply operation power to the communicator.

The apparatus may include a display, and the controller may control the display to display a user menu to perform a setting regarding the WOL function.

The user menu may include an on item to turn on the WOL function, an off item to turn off the WOL function, and an auto item to determine whether the WOL is turned either on or off automatically according to the network setting state.

According to an exemplary embodiment, a method is provided for controlling a display apparatus including determining a network setting state of a display apparatus and determining whether a WOL function is turned either on or off according to the determined network setting state and controlling the display apparatus based on the determining.

The determining whether a WOL function is turned either on or off may include, in response to a network setting being performed by a user, determining that the WOL function is turned on, and in response to a network setting not being performed by a user, determining that the WOL function is turned off.

The determining whether a WOL function is turned either on or off may include, in response to the determining the WOL function being turned on, switching to apply standby power to the communicator, and in response to the determining the WOL function being turned off, switching to apply operation power to the communicator.

The method may include, in response to the determining the WOL function being turned on, applying standby power to the communicator while the display apparatus is in a standby mode or in an operation mode.

The method may include, in response to the WOL function being turned off, not applying power to the communicator while the display apparatus maintains a standby mode, and in response to the display apparatus being converted to be in an operation mode, applying operation power to the communicator.

The method may include displaying a user menu to perform a setting regarding the WOL function.

The user menu may include an on item to turn on the WOL function, an off item to turn off the WOL function, and an auto item to determine whether the WOL is turned either on or off automatically according to the network setting state.

According to at least one of the exemplary embodiments, when a user does not wish to perform a WOL function or is unaware of the WOL function, unnecessary power consumption due to the WOL function can be prevented.

BRIEF DESCRIPTION OF THE DRAWINGS

The above and/or other aspects of the present inventive concept will be more apparent by describing certain exemplary embodiments of the present inventive concept with reference to the accompanying drawings, in which.

DETAILED DESCRIPTION

Figure 1:
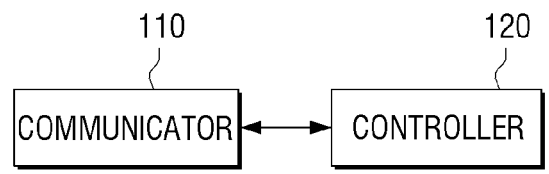
FIG. 1 is a block diagram illustrating configuration of a display apparatus according to an exemplary embodiment.

Reference will now be made in detail to the embodiments, examples of which are illustrated in the accompanying drawings, wherein like reference numerals refer to the like elements throughout. The embodiments are described below to explain the present invention by referring to the figures.

The exemplary embodiments may vary, and may be provided in different exemplary embodiments. Specific exemplary embodiments are described with reference to accompanying drawings and detailed explanation. However, this does not necessarily limit the scope of the exemplary embodiments to a specific embodiment form. Instead, modifications, equivalents and replacements included in the disclosed concept and technical scope of this specification may be employed.

Relational terms such as "first" and "second," and the like, may be used to distinguish one entity from another entity, without necessarily implying any actual relationship or order between such entities.

The terms used are provided to explain a specific exemplary embodiment and are not intended to limit the scope of rights. A singular term includes a plural form unless it is intentionally written otherwise. The terms "include", "comprise", "is configured to", etc. of the description are used to indicate that there are features, numbers, operations, elements, parts or combination thereof, and not exclude the possibilities of combination or addition of one or more features, numbers, operations, elements, parts or combination thereof.

According to an exemplary embodiment, "a module" or "a unit" performs at least one function or operation, and may be realized as hardware, software, or combination thereof. According to an embodiment, a plurality of "modules" or a plurality of "units" may be integrated into at least one module and may be realized as at least one processor (not shown) except for "modules" or "units" that are disclosed otherwise in a specific hardware.

Exemplary embodiments are described in greater detail with reference to the accompanying drawings. FIG. 1 is a block diagram illustrating a configuration of an apparatus, e.g., a display apparatus 100 according to an exemplary embodiment. As illustrated in FIG. 1, the display apparatus 100 includes a communicator 110 and a controller 120. The display apparatus 100 according to an exemplary embodiment may be, for example, a smart TV. The display apparatus 100 may be, for example, at least one of various apparatuses, e.g., display apparatuses such as a desktop PC, a notebook PC, and a kiosk, etc.

The communicator 110 may communicate with at least one external apparatus. The communicator 110 may receive a power-on command from at least one external apparatus to perform a WOL function. The communicator 110 may transmit the received power-on command to the controller 120.

The controller 120 may control an operation, e.g., control the overall operation of the display apparatus 100. The controller 120 may determine a network setting state, and determine whether a WOL function is turned either on or off according to the network setting state.

if a network setting is performed by a user, the controller 120 may turn on a WOL function. However, if a network setting is not performed by a user, the controller 120 may turn off the WOL function. The network setting may be defined as a process of setting network information (IP address, gateway information, DNS information, etc.) in order to perform a communication through a network. If a user does not perform a network setting, the controller 120 may determine that the WOL function is not in use and turn off the WOL function.

If the WOL function is turned on, the controller 120 may switch to apply standby power to the communicator 110. When the WOL function is turned off, the controller 120 may switch to apply operation power to the controller 110. In this case, for example, the amount of power consumed in the standby power may be less than the operation power.

If the WOL function is turned on, the controller 120 may apply standby power during a standby mode and an operation mode. If the WOL function is turned on, the controller 120 may apply standby power regardless of the mode of the display apparatus 100.

However, if the WOL function is turned off, the controller 120 may not apply power to the communicator 110 while the display apparatus 100 maintains a standby mode. When a user command or a power-on command is received, for example, from outside and thus, the display apparatus 100 is converted to be in an operation mode, the controller 120 may apply operation power to the communicator 110.

If a user does not perform a network setting and thus, turns off the WOL function, the display apparatus 100 may prevent unnecessary standby power from being wasted in order to perform the WOL function.

Figure 2:
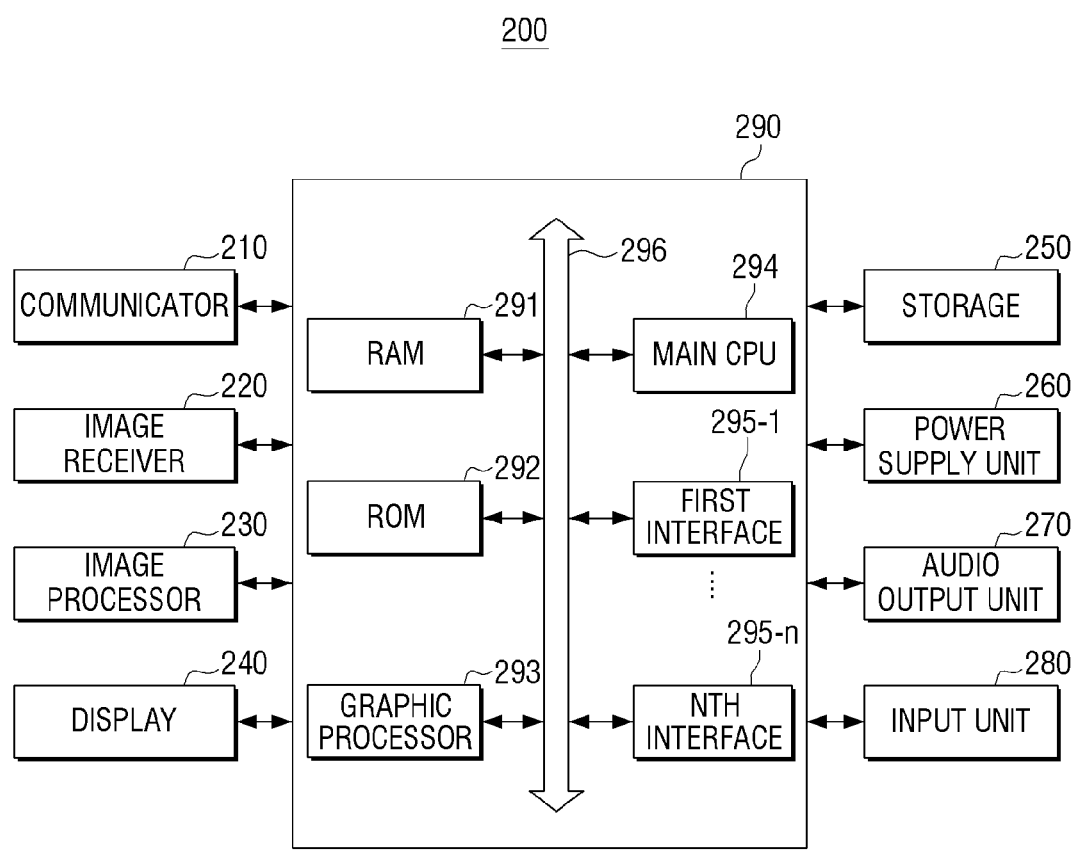
FIG. 2 is a block diagram illustrating configuration of a display apparatus according to an exemplary embodiment.

An exemplary embodiment is described with reference to FIGS. 2 to 4. FIG. 2 is a block diagram illustrating a configuration of a display apparatus 200 according to an exemplary embodiment. As illustrated in FIG. 2, the display apparatus 200 includes a communicator 210, an image receiver 220, an image processor 230, a display 240, a storage 250, a power supply unit 260, an audio output unit 270, an input unit 280, and a controller 290.

The communicator 210 may communicate with at least one of various types of external apparatuses according to at least one of various types of communication methods. If a WOL function is turned on, the communicator 210 may receive a power-on command from an external apparatus (for example, a smart phone, etc.) using, for example, a LAN card via wireless and/or wired method during a standby mode.

The communicator 210 may include at least one of various communication chips such as a WiFi chip, a Bluetooth chip, an NFC chip, and a wireless chip. The Wi-Fi chip, the Bluetooth chip and the NFC chip may perform communications according to a LAN method, a Wi-Fi method, a Bluetooth method, and an NFC method, respectively. The NFC chip represents a chip that operates according to an NFC method that uses, for example, a 13.56 MHz band among various RF-ID frequency bands such as 135 kHz, 13.56 MHz, 433 MHz, 860~960 MHz, 2.45 GHz, and so on. In the case of using the Wi-Fi chip or the Bluetooth chip, various connection information, such as SSID and a session key, may be transmitted/received for communication connection and then, various information may be transmitted/received. The wireless communication chip may be a chip that performs communication according to at least one of various communication standards such as IEEE, Zigbee, 3rd Generation (3G), 3rd Generation Partnership Project (3GPP), Long Term Evolution (LTE) and so on.

If a WOL function is turned on, standby power may be supplied to an element to provide the WOL function (for example, a LAN card) out of the communicator 210, and if the WOL function is not turned on, standby power may not be supplied to an element for providing the WOL function out of the communicator 210.

The image receiver 220 may receive various image contents from outside. The image receiver 220 may receive, for example, broadcast contents from an external broadcasting station, image contents from an external apparatus (for example, a DVD player, etc.), and VOD contents from an external server.

The image processor 230 processes image data obtained from the image receiver 220. The image processor 230 may perform various image processing operations with respect to image data, such as decoding, scaling, noise filtering, frame rate conversion, resolution conversion, etc.

The display 240 displays at least one of an image content received from the image receiver 220 and various UIs processed by the graphic processor 293. The display 240 may display a user menu to perform a setting with respect to the WOL function. In this case, for example, the user menu to perform a setting with respect to the WOL function may include an on item to turn on the WOL function, an off item to turn off the WOL function, and an auto item to determine whether the WOL is turned either on or off, for example, automatically according to the network setting state.

The storage 250 stores various modules to drive the display apparatus 200.

The storage 250 stores various modules to drive the electronic apparatus 200. For example, the storage 250 may store software including a base module, a sensing module, a communication module, a presentation module, a web browser module, and a service module. In this case, for example, the base module may be defined as a basic module that processes a signal transmitted from each hardware included in the display apparatus 200, and transmits the processed signal to an upper layer module. The sensing module is a module that collects information from at least one of various sensors. The sensing module, may analyze and manage the collected information. The sensing module may include at least one of a face recognition module, a voice recognition module, a motion recognition module, and an NFC recognition module, and so on. The presentation module is a module to compose a display screen. The presentation module includes a multimedia module to reproduce and output multimedia contents, and a UI rendering module to process UI and graphics. The communication module is a module to perform communications with the outside. The service module is a module including at least one of various applications to provide at least one of various services. The storage 250 may store a WOL application module to perform a WOL function.

The storage 250 may include various program modules, but some of the various program modules may be omitted or changed, or new modules may be added according to the type and characteristics of the display apparatus 200. For example, if the display apparatus 200 is a tablet PC, the base module may include, for example, a location determination module to determine a GPS-based location, and the sensing module may include a sensing module to detect a user's operation.

The power supply unit 260 supplies power to at least one of various elements of the display apparatus 200 under the control of the controller 290. if a WOL function is turned on, the power supply unit 260 may supply standby power to the communicator 210 during a standby mode. However, if the WOL function is turned off, the power supply unit 260 may be switched to operate with operation power, and standby power may not be supplied to the communicator 210 during a standby mode.

The audio output unit 270 may output not only various audio data, but also at least one of various alarm sounds or voice messages that may be processed by an audio processor (not shown).

The input unit 280 receives at least one of various user manipulations to control the display apparatus 200. The input unit 280 may receive a user command to perform a setting with respect to a WOL function. The input unit 280 may be realized as at least one of various input apparatuses to receive a user manipulation, such as a remote controller, a voice input unit, a motion input unit, a pointing device, etc.

The controller 290 controls operations, e.g., the overall operations of the display apparatus 200 using various programs stored in the storage 250.

The controller 290, as illustrated in FIG. 2, includes a RAM 291, a ROM 292, a graphic processor 293, a main CPU 294, a first to nth interface 295-1~295-n, and a bus 296. The RAM 291, the ROM 292, the graphic processor 293, the main CPU 294, the first to the nth interface 295-1~295-n, etc. may be interconnected through the bus 296.

The ROM 292 stores a set of commands for system booting. If a turn-on command is input and thus, power is supplied, the main CPU 294 copies O/S stored in the storage 250 in the RAM 291 according to a command stored in the ROM 292, and boots a system by executing the O/S. When the booting is completed, the main CPU 294 copies various application programs stored in the storage 250 in the RAM 291, and executes the application programs copied in the RAM 291 to perform various operations.

The graphic processor 293 generates a screen including various objects such as an icon, an image, a text, etc. using an computing unit (not shown) and a rendering unit (not shown). The computing unit computes property values such as coordinates, shape, size, and color of each object to be displayed according to the layout of the screen using a control command received from an input unit. The rendering unit generates a screen with various layouts including objects based on the property values computed by the computing unit. The screen generated by the rendering unit is displayed in a display area of the display 240.

The main CPU 294 accesses the storage 250, and performs booting using an Operating System (O/S) stored in the storage 250. The main CPU 294 performs at least one of various operations using at least one of various programs, contents, data, etc. that are stored in the storage 250.

The first to the nth interface 295-1 to 295-*n* may be connected to the at least one of the above-described various elements. One of the interfaces may be a network interface that is connected to an external apparatus via a network.

The controller 290 may determine whether a WOL function is turned either on or off according to a network setting state. The controller 290 may determine whether a network setting is performed by a user. More specifically, the controller 290 may determine whether a user performs a network setting to communicate with an external network using the display apparatus 200. The network setting may be an operation where a user sets an IP address of the display apparatus 100, setting gateway and a Domain Name Server (DNS), etc.

The controller 290 may determine whether a WOL function is turned either on or off according to whether a network is set by a user. If a network setting is performed by a user, the controller 290 may turn on the WOL function, and if a network setting is not performed by a user, the controller 290 may turn off the WOL function. In other words, if a user does not perform a network setting, it indicates that the user may not want to via a network or may not know how to communicate via a network. Accordingly, if a user does not perform a network setting, the controller 290 may turn off the WOL function automatically.

The controller 290 may supply power differently depending on whether the WOL function is turned either on or off. The standby mode according to an exemplary embodiment may be defined as a mode where AC power may be applied to the display apparatus 200 and at least one of some elements (for example, the controller 290, the communicator 210, etc.) may be activated to perform certain operations, e.g., minimum operations (for example, a power-on operation, etc.) of the display apparatus 200. The operation mode may be defined as a mode where the display apparatus 200 may be booted and at least some of, e.g., most of the general elements of the display apparatus 200 are activated.

Figure 3A:
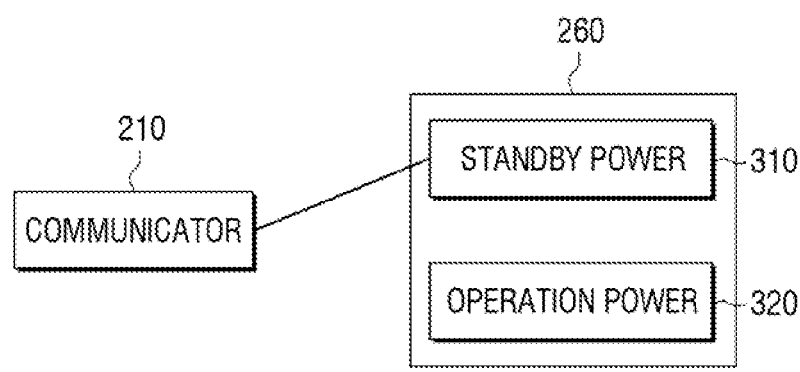
FIGS. 3A and 3B are views illustrating a power supply in a standby mode and an operation mode depending on whether a WOL function is turned either on or off according to an exemplary embodiment.
Figure 3A:
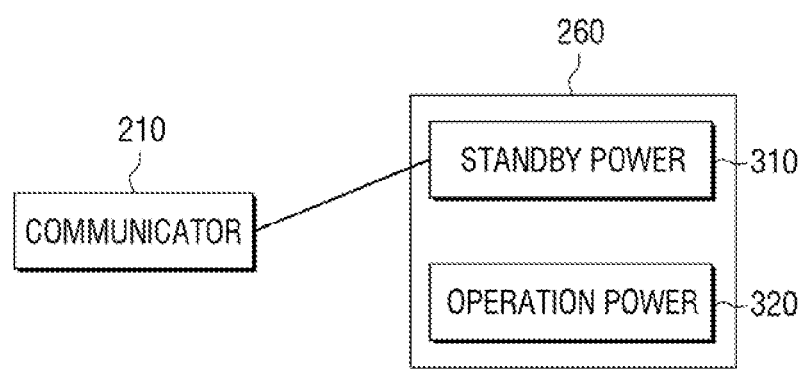
Figure 4:
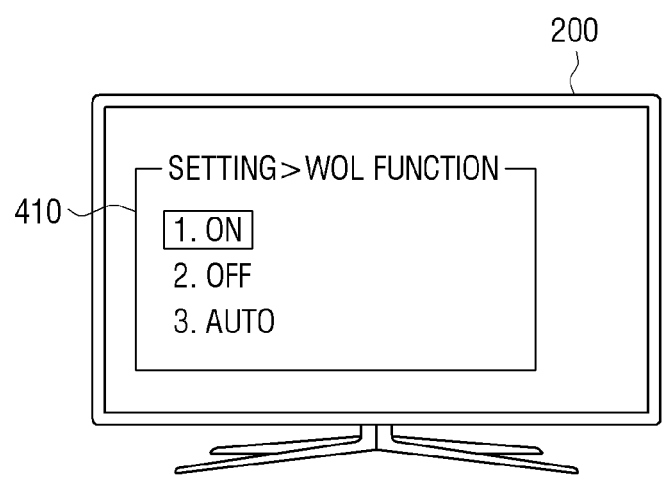
FIG. 4 is a view illustrating a user menu to set a WOL function according to an exemplary embodiment.

When a WOL function is turned on, if the display apparatus 200 maintains a standby state, the controller 290 may control the power supply unit 260 to supply standby power to the communicator 210, as illustrated in the upper part of FIG. 3A.

If a power-on command is received from an external apparatus (for example, a smart phone, etc.) remotely through the communicator 210 or a power-on command is received through a remote controller, for example, and from the input unit 280 while a standby mode is maintained, the controller 290 may convert the mode of the display apparatus 200 from the standby mode to an operation mode.

If the mode is converted to the operation mode, the controller 290 may control the power supply unit 260 to apply standby power to the communicator 210 as illustrated in the lower part of FIG. 3A. In other words, the controller 290 may control the power control unit 260 to apply standby power to the communicator 210 even if the mode of the display apparatus 200 changes.

Figure 3B:
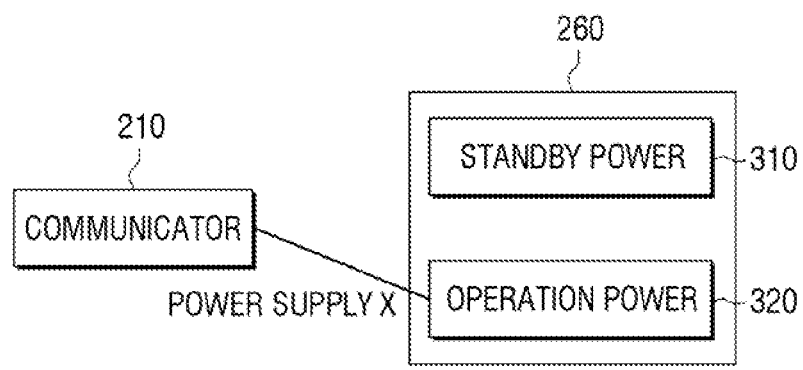
Figure 3B:
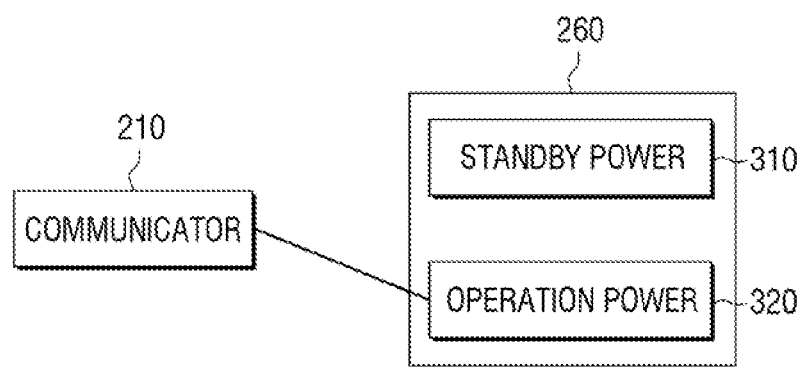

When the WOL function is turned off, if the display apparatus 200 maintains a standby mode, the controller 290 may control the power supply unit 260 not to supply power to the communicator 210 as illustrated in the upper part of FIG. 3B.

If a power-on command is received, for example, through a remote controller, for example, output from the input unit 280 while the standby mode is maintained, the controller 290 may convert the mode of the display apparatus 200 from the standby mode to the operation mode.

When the mode is converted to the operation mode, the controller 290 may control the power supply unit 260 to apply operation power to the controller 210, as illustrated in the lower part of FIG. 3B.

The controller 290 may turn either on or off the WOL function automatically according to a network setting state. If a user determines that the WOL function will not be used and thus, turns off the WOL function automatically, the controller 290 may prevent standby power from being consumed unnecessarily to maintain the WOL function during a standby mode.

According to an exemplary embodiment, the controller 290 may control the display 240 to display a user menu 410 to perform a setting with respect to the WOL function. An exemplary user menu, as illustrated in FIG. 4, may include, for example, an on item (e.g., "ON") to turn on the WOL function, an off item (e.g., "OFF") to turn off the WOL function, and an auto item (e.g. "AUTO") to determine whether the WOL is turned either on or off automatically according to the network setting state.

If a user command to select the on item is input from the user menu 410, the controller 290 may turn on the WOL function regardless of whether a network setting is performed. In this case, if the network setting is not performed, the controller 290 may control the display 240 to display a guidance message informing that a network setting is not performed or display a network setting menu to perform a network setting.

If a user command to select the off item is selected from the user menu 410 through the input unit 280, the controller 290 may turn off the WOL function regardless of whether a network setting is performed.

If a user command to select the auto item is selected from the user menu 410 through the input unit 280, the controller 290 may turn the WOL function automatically according to a network setting state. If a network setting is performed by a user, the controller 290 may turn on the WOL function, and if a network setting is not performed by a user, the controller 290 may turn off the WOL function.

Figure 5:
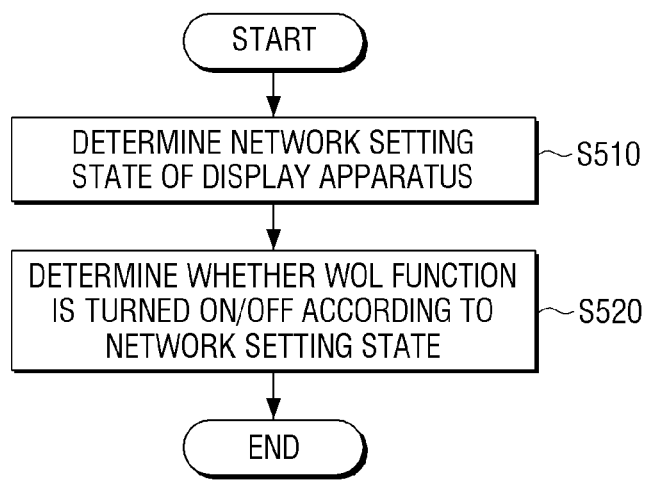
FIG. 5 is a flowchart illustrating a method for controlling a display apparatus according to an exemplary embodiment.

A method for controlling the display apparatus 100 according to an exemplary embodiment is described with reference to FIG. 5.

The display apparatus 100 determines a network setting state of the display apparatus 100 (S510). The display apparatus 100 may determine whether a user performs a network setting to communicate with an external apparatus.

The display apparatus 100 determines whether a WOL function is turned either on or off according to a network setting state (S520). If a network setting is performed by a user, the display apparatus 100 may turn on the WOL function, and if a network setting is not performed by a user, the display apparatus 100 may turn off the WOL function. If a user does not perform a network setting, the WOL function is turned off and thus, standby power is not supplied to the communicator 110 to perform the WOL function during a standby mode.

Accordingly, as the WOL function is turned off automatically according to a network setting state, it is possible to prevent standby power from being consumed unnecessarily even when the user does not use the WOL function.

A method for controlling the display apparatus according to the at least one of the above-described various exemplary embodiments may be realized as a program and provided in a user terminal apparatus. A non-transitory computer readable medium that stores a program including the exemplary controlling method of a user terminal apparatus may be provided.

A non-transitory recordable medium refers to a medium that may store data semi-permanently rather than storing data for a short time, such as register, cache, memory, etc. and is readable by an apparatus At least one of exemplary embodiment of the above-described various applications and programs may be stored and provided in a non-transitory recordable medium such as CD, DVD, hard disk, Blu-ray disk, USB, memory card, ROM, etc.

The foregoing embodiments and advantages are merely exemplary and are not to be construed as limiting the present invention and may be applied to other types of apparatuses. Also, the description of the exemplary embodiments of the present inventive concept is intended to be illustrative, and not to limit the scope of the claims, and alternatives, modifications, and variations will be apparent to those skilled in the art.

Although a few embodiments have been shown and described, it would be appreciated by those skilled in the art that changes may be made in these embodiments without departing from the principles and spirit of the invention, the scope of that is defined in the claims and their equivalents.

What is claimed is:

1. A display apparatus, comprising:
   a communicator configured to communicate with an external device through a network;
   a power supply configured to supply operation power or standby power less than the operation power to the communicator; and
   a controller configured to determine whether a Wake On LAN (WOL) function is turned either on or off according to a network setting state for the display apparatus, and
   wherein the controller, in response to a network setting being performed by a user, turns on the WOL function, and in response to a network setting not being performed by a user, turns off the WOL function,
   wherein the controller, in response to the display apparatus entering from a standby mode to an operation mode, controls the power supply unit to maintain the standby power to the communicator when the WOL function is turned on, and
   wherein the controller, in response the display apparatus entering from the standby mode to the operation mode, controls the power supply to apply the operation power to the communicator when the WOL function is turned off.

2. The apparatus as claimed in claim 1, further comprising:
   a display,
   wherein the controller controls the display to display a user menu to perform a setting regarding the WOL function.

3. The apparatus as claimed in claim 2, wherein the user menu includes an on item to turn on the WOL function, an off item to turn off the WOL function, and an auto item to determine whether the WOL is turned on/off automatically according to the network setting state.

4. A method for controlling a display apparatus including a communicator configured to communicate with an external device through a network and a power supply configured to supply operation power or standby power less than the operation power to the communicator, comprising:
   determining a network setting state for the display apparatus;
   determining whether a Wake On LAN (WOL) function is turned either on or off according to the determined network setting state;
   in response to the display apparatus entering from a standby mode to an operation mode, maintaining the standby power to the communicator when the WOL function is turned on; and
   in response to the display apparatus entering from the standby mode to the operation mode, applying the operation power to the communicator when the WOL function is turned off,
   wherein the determining whether the WOL function is turned either on or off comprises, in response to a network setting being performed by a user, determining that the WOL function is turned on, and in response to a network setting not being performed by a user, determining that the WOL function is turned off.

5. The method as claimed in claim 4, further comprising:
   displaying a user menu to perform a setting regarding the WOL function.

6. The method as claimed in claim 5, wherein the user menu includes an on item to turn on the WOL function, an off item to turn off the WOL function, and an auto item to determine whether the WOL is turned either on or off automatically according to the network setting state.

* * * * *